United States Patent Office 3,316,654

Patented May 2, 1967

3,316,654

PROCESS FOR DRYING FILM

Frank P. Gay, Wilmington, Del., assignor to E. I. du Pont de Nemours and Company, Wilmington, Del., a corporation of Delaware No Drawing. Filed Apr. 29, 1965, Ser. No. 451,967
3 Claims. (Cl. 34—23)

This invention relates to drying of aromatic polyimide films.

By "aromatic polyimide film" is meant a film of an aromatic polyimide or partially converted aromatic polyamide-acid (i.e., partially converted to the corresponding aromatic polyimide) which is not completely free of volatile components such as solvent, the latter being most frequently the case. The volatile components will ordinarily be present in the film in an amount of from about 0.3 up to about 20% by weight based on the weight of the polymer. Amounts as high as 30% or more can be present but below about 20% is preferred to decrease tendency to blister the film or ignite the solvent.

Because of the tight binding of solvents and/or other volatiles by aromatic polyimides and the slow diffusion rate from the dense structure, high temperatures are required for the final drying of films made of aromatic polyimides. It is difficult to strike a balance between drying and degradation when one uses conventional drying methods, e.g., radiant heating or hot gases, on a large scale.

Naturally, an aromatic polyimide film can tolerate brief exposures to temperatures up to its normal decomposition temperature. One would not expect, however, that it could be exposed to temperatures at or above its normal decomposition temperature without harmful effects. It is therefore quite surprising that, as discovered according to the present invention, such brief temperature surges not only are harmless but actually beneficial to a polyimide film.

According to the present invention, a volatile-containing aromatic polyimide film, while being held under restraint such that substantially no shrinkage can occur, is exposed on at least one surface to contact with an open gas flame for a time sufficient to raise the film temperature to between about 500° C. and the zero strength temperature of the film which for most aromatic polyimides is in the range from 750° to 850° C.

Now it will be readily understood that film temperature, because of the well-recognized difficulty in measuring such temperature, is somewhat approximate and is intended to include a moderate extension of the indicated range. To serve as guidance, it is within the concept of this invention to expose the film being treated to an open flame for a substantial period of time, that is, long enough to destroy a film of polyethylene terephthalate or to melt 5 mil aluminum foil exposed to flame in the same fashion. Ordinarily, if the film permits use of a thermocouple on the film surface, a thermocouple on the flamed side of the film will indicate a temperature in the range of 500° C. to the zero strength temperature of the film. Ordinarily, this will also mean that, at least for polyimide films of less than about 10 mils thick, and where only one side of the film is being flame treated, a thermocouple on the unflamed side of the film will indicate a temperature of at least about 350° C. In such measurements, the thermocouple can be conveniently positioned on the film surface at the point of impingement of the flame, or for a reverse side measurement exactly opposite the point of impingement, and held there for about 0.3 second.

The film temperature at any one location on the film surface should be held above 500° C. for a time of as short as a tenth or two-tenths of a second, since even an extremely brief treatment effects some drying and some property improvement, but preferably will be on the order of 0.3 to 0.6 second. Times of the order of a few seconds are tolerable and the actual time will be determined by balancing the level desired of the residual solvent or other volatiles, film thickness, flame intensity, the particular aromatic polyimide being treated, etc. A suitable length of time will be that sufficient for the film to approach a thermal steady state with respect to the flame. Since excellent results can be obtained in as short a time as less than 3 or 4 seconds according to this invention using proper conditions, e.g., flame intensity, flame to film distance, and the like, times in excess of this will ordinarily not be used since this would increase the hazard of ignition and film degradation. However, as said before, under some conditions, particularly at lower temperatures, longer treating times can be tolerated, as can readily be determined without undue experimentation and as will readily be understood by persons skilled in this art.

The restraint on the film will somewhat depend on how much tension is initially placed on the film but generally speaking the restraint should be sufficient to prevent a shrinkage of about 5% in any direction.

It has been found surprisingly that the nature of the flame, the distance of its source from the film surface, the rate of relative movement of the film and flame, whatever cooling method if any may be used as desired to reduce or prevent ignition or deterioration of the film, and other such factors, are not critical as is usually the case in conventional flame-treating operations on non-volatile containing plastic films for improving their adherability. By contrast, in the practice of the present invention, the exposure of the solvent-containing film to the flame, raising the film temperature above its normal decomposition temperature as described, achieves the beneficial result without critical control of such variables.

The thickness of the film being treated is not critical and, as will be readily appreciated particularly with respect to polyamide-acid or polyamide-acid/imide gel films, is not always easily determinable since some types of gauges used for measuring film thickness simply sinks into the film. Ordinarily, the film will have a dry thickness in the range of about 0.1 to 10 mils and films having thicknesses as high as 20 mils or more can be improved by the flame treatment according to this invention, particularly when both sides of the film are flame-treated. Actually, by practice of this invention, it is possible to temper the surface of thicker polyimide objects by flame treatment and by this means the surface can be tempered up to a depth of about 10 mils.

Treatment of the aromatic polyimide film according to this invention not only effects a reduction in the amount of volatiles in the film but has a beneficial smoothing and tightening effect. In addition, treatment of this invention surprisingly imparts an increase in tensile strength, up to as much as 15 or 20% or even more, without degradation, as would be indicated by any substantial decrease in elongation.

Flame drying according to this invention also is a good method for increasing the molecular orientation of a polyimide film. As shown by the examples below, the orientation angles of the film in both the machine direction and the transverse direction can be effectively lowered.

The aromatic polyimide films usefully treated in the process of this invention are known. Such polyimides are those of an organic aromatic diamine and an organic aromatic tetracarboxylic acid.

The organic diamines are characterized by the formula:

$$H_2—N—R^1—NH_2$$

wherein $R^1$ is a divalent aromatic radical (arylene), preferably selected from the following groups: phenylene, naphthylene, biphenylene, anthrylene, furylene, benzfurylene and

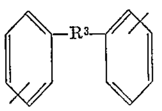

wherein $R^3$ is selected from the group consisting of an alkylene chain having 1–3 carbon atoms,

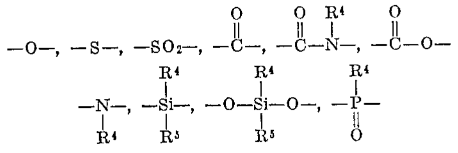

and

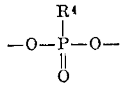

wherein $R^4$ and $R^5$ are alkyl or aryl, and substituted groups thereof. Among the diamines which are suitable for use in the present invention are: meta-phenylene diamine; para-phenylene diamine; 2,2-bis(4-amino-phenyl) propane; 4,4'-diamino-diphenyl methane; 4,4'-diamino-diphenyl sulfide; 4,4'-diamino-diphenyl sulfone; 3,3'-diamino-diphenyl sulfone; 4,4'-diamino-diphenyl ether; 2,6-diamino-pyridine; bis(4-amino-phenyl) diethyl silane; bis(4-amino-phenyl) diphenyl silane; benzidine; 3,3'-dichlorobenzidine; 3,3'-dimethoxy benzidine; bis(4-amino-phenyl) ethyl phosphine oxide; bis(4-amino-phenyl) phenyl phosphine oxide; bis(4-amino-phenyl)-N-butylamine; bis(4-amino-phenyl) - N - methylamine; 1,5-diamino-naphthalene; 3,3'-dimethyl - 4,4'-diaminobiphenyl; N-(3-aminophenyl) - 4-aminobenzamide; 4-aminophenyl-3-aminobenzoate; and mixtures thereof.

The aromatic tetracarboxylic acid is most conveniently used as the corresponding dianhydride characterized by the following formula:

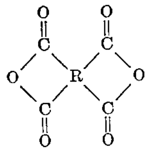

wherein R is a tetravalent aromatic radical, e.g.

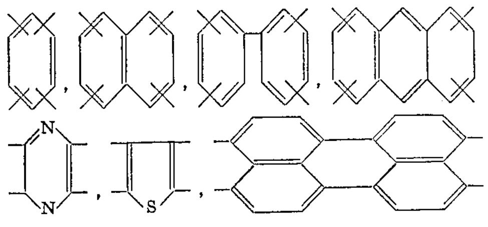

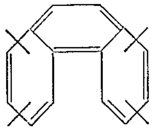

and

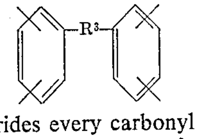

In these dianhydrides every carbonyl group is attached directly to a separate carbon atom of the aromatic radical, the carbonyl groups being in pairs, the groups of each pair being adjacent to each other. Adjacent means ortho or peri, so that the dicarboxylanhydro rings are 5- or 6-membered, respectively.

The preferred aromatic dianhydrides are those in which the carbon atoms of each pair of carbonyl groups are directly attached to ortho carbon atoms in the R group to provide a 5-membered ring as follows:

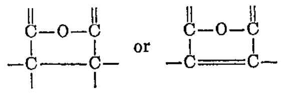

Illustrations of dianhydrides suitable for use in the present invention include: pyromellitic dianhydride; 2,3,6,7-naphthalene tetracarboxylic dianhydride; 3,3',4,4'-diphenyl tetracarboxylic dianhydride; 1,2,5,6-naphthalene tetracarboxylic dianhydride; 2,2'3,3'-diphenyl tetracarboxylic dianhydride; 2,2-bis(3,4-dicarboxyphenyl) propane dianhydride; bis(3,4-dicarboxyphenyl) sulfone dianhydride; 3,4,9,10-perylene tetracarboxylic dianhydride; bis(3,4-dicarboxyphenyl) ether dianhydride; naphthalene-1,2,4,5-tetracarboxylic dianhydride; naphthalene-1,4,5,8-tetracarboxylic dianhydride; 2,6-dichloronaphthalene-1,4,5,8-tetracarboxylic dianhydride; 2,7-dichloronaphthalene-1,4,5,8-tetracarboxylic dianhydride; 2,3,6,7-tetrachloronaphthalene - 1,4,5,8-tetracarboxylic dianhydride; phenanthrene - 1,8,9,10 - tetracarboxylic dianhydride; 2,2-bis(2,3 - dicarboxyphenyl) propane dianhydride; 1,1-bis(2,3-dicarboxyphenyl) ethane dianhydride; 1,1-bis(3,4-dicarboxyphenyl) ethane dianhydride; bis(2,3-dicarboxyphenyl) methane dianhydride; bis(3,4-dicarboxyphenyl) methane dianhydride; bis(3,4-dicarboxyphenyl) sulfone dianhydride; benzene-1,2,3,4-tetracarboxylic dianhydride; 3,4,3',4'-benzophenone tetracarboxylic dianhydride; 2,3,-2',3'-benzophenone tetracarboxylic dianhydride; 2,3,3',4'-benzophenone tetracarboxylic dianhydride; etc.

The diamines and dianhydrides can be reacted in a suitable solvent to make the polyamide-acid which can then be formed into a film and converted as desired to polyamide. Suitable techniques are described for example in Edwards United States patent application Ser. No. 95,014 filed Mar. 13, 1961, now Patent No. 3,179,614.

Although the term "polyimide" has been primarily used above, it will be understood that such term is used in its broad sense to include a polymeric imide and/or a polymeric polyamide-acid, polyamide-acid salts, polyamide-amide and/or polyamide-ester precursor convertible to the polymeric imide, as well as mixtures of these or mixtures of more than one of each of these. Within the scope of diamines and dianhydrides defined above, it will be understood that these terms are used herein in their broad sense and are intended to include homopolymers, copolymers, blends, or mixtures of homopolymers and/or copolymers, and any and all of these containing fillers, additives, modifying agents such as plasticizers, pigments, dyes, lubricants, etc.

Although as said above, the volatile content will primarily be solvent used in the polymerization reaction, the term is used in its normal sense to include any types of volatile substance regardless of its nature which is removable on heating. It includes not only materials which may be in the film from earlier stages of processing, such as the solvent or polymerization medium, converting agents, by-products, catalysts, and the like, but also a variety of liquids which may be in the film as diluent for a converting agent, a catalyst, or any other material, or as a left-over of a solvent exchange or washing operation. In one particular embodiment, the volatile content of the film can has been introduced into the film by a subsequent wetting or soaking of a dried or partially dried film.

Illustrative but not exhaustive of the volatiles which can be in the films can be mentioned all of the solvents and volatile materials mentioned in the Edwards U.S. patent application identified above. Typical of such materials are the following: N,N-dialkylcarboxylamides such as N,N-dimethylformamide, N,N - diethylformamide, N,N-dimethylacetamide, N,N-diethylacetamide, N,N-dimethylmethoxy acetamide, N-methyl caprolactum, etc.; dimethylsulfoxide, N-methyl-2-pyrrolidone, tetramethylene urea, pyridine, dimethylsulfone, hexamethylphosphoramide, tetramethylene sulfone, formamide, N-methylformamide, butylrolactone and N-acetyl-2-pyrrolidone; saturated hydrocarbons such as hexane, cyclohexane, decane, etc.; aromatic hydrocarbons such as benzene, toluene, xylene, naphthalene, etc.; ethers such as diethyl ether, tetrahydrofuran, dioxane anisole, etc.; nitriles such as acetonitrile, benzonitrile, etc.; esters such as butyl acetate, ethyl propionate, etc.; ketones such as methyl ethyl ketone, acetophenone, etc.; anhydrides such as acetic anhydride, propionic anhydride, benzoic anhydride, ketene, etc.; carboxylic acids such as acetic acid, butyric acid, benzoic acid, etc.; tertiary amines such as pyridine, isoquinoline, 3,5-lutidine, N,N-dimethyldodecylamine, N-ethylmorpholine, N,N-dimethylcyclohexylamine, etc.; phenols such as phenol p-cresol, 2,5-xylenol, etc.; alcohols such as methanol, ethanol, hexyl alcohol, benzyl alcohol, etc.; halogenated compounds such as chloroform, methylene chloride, carbon tetrachloride, trichlorotrifluoroethane, chlorobenzene, bromobenzene, etc.; volatile plasticizers such as diethyl phthalate, dimethyl suberate, etc.; dimethyl cyanamide; water; etc.

*Tensile strength, elongation and initial tensile modulus.*—These measurements are determined at 23° C. and 50% relative humidity. They are determined by elongating the film sample (samples were cut with a Thwing-Albert Cutter which cut samples ¼″ wide) at a rate of 100% per minute until the sample breaks. The force applied at the break in pounds/square inch (p.s.i.) is the tensile strength. The elongation is the percent increase in the length of the sample at breakage. Initial tensile modulus in p.s.i. is directly related to film stiffness. It is obtained from the slope of the stress-strain curve at the elongation of 1%; both tensile strength and initial tensile modulus are based upon the initial cross-sectional area of the sample.

*X-ray equipment.*—The X-ray unit used was built by the General Electric Corporation, Milwaukee, Wis., type XRD-5D1, with a motorized single crystal orienter. Details of the single crystal orienter are available in manual No. 12130 of the General Electric Corporation. The sample is mounted in the single crystal orienter on the goniometer using the microscope supplied for this purpose to accurately align it with reference to the X-ray beam. The protractor is set at Bragg angle of $2\theta=50\%$; the horizontal axis (chi) on the single crystal orienter is set to 0° setting the sample vertical. The angle chi gives the inclination of the transverse direction with the vertical direction. The sample is centered with reference to the microscope crosshairs by adjusting the arc and lateral movement of the goniostat. The alignment of the sample is checked at various Bragg angles and at chi angles of 0° and 90° (vertical and horizontal). It is rotated through the polar axis (phi) at 360° at each setting. The axes of the sample should be centered at all positions. With inclination (chi) at 0° and Bragg angle ($2\theta$) at 50°, the sample is aligned such that the plane of the film is parallel to the axis of sight. The sample is positioned finally by rotating it 25° counter clockwise, using the polar (phi) rotation. This aligns the sample with the machine direction parallel to the beam when the Bragg angle ($2\theta$) is at 0°. The X-ray diffraction peaks are recorded while continuously increasing the Bragg angle ($2\theta$) at 2° a minute with the sample mounted as above using a GE #5 SPG proportional counter tube Zenon filled. A standard copper target X-ray tube is used with 50 kilovolts and 16 milliamperes.

*Orientation angles.*—The orientation angles used as a measure of the amount of amorphous and crystalline orientation in the film are obtained using the intensity at half level base to peak at Bragg angle ($2\theta$) of 5.7°. The sample is then rotated through the entire angular range of chi with the intensity of the X-ray diffracted being monitored. The orientation angle is measured in degrees of the line half-way between the base and the maximum of the peak parallel to the base and intercepted by each end of the curve assuming complete circular rotation would give similar angular intensity relations in the other quarters of the rotation as that available. This orientation angle is designated as the machine direction (end) orientation angle. With chi set at 0° and continuously rotating the sample through angle phi and monitoring the X-ray intensity, the orientation angle of transverse direction (edge) is similarly obtained. For a balanced film, these two orientation angles are equal or nearly equal.

This invention will be more clearly understood by reference to the following examples. These examples illustrate specific embodiments of the present invention and should not be construed to limit the invention in any way.

EXAMPLE 1

A 4 x 6 inch sample of a film (3 mils thick) of the polypyromellitimide of bis(4-aminophenyl) ether containing 1.3% by weight of N,N-dimethylacetamide and 3.4% by weight of isoquinoline was fastened onto a metal frame and heated with the flame from a Meeker burner supplied by illuminating gas. The burner was held about 1½ inches below the horizontal plane of the film. Heating was started at one end, and the flame was moved in an oscillating motion as fast as the heated area assumed a bright, taut appearance. The polymer crystallized considerably, and its orientation angle decreased from about 50° to 34° (MD) and 38° (TD), showing increased orientation and strength.

EXAMPLE 2

A sample of a polypyromellitamide/acid of bis(4-aminophenyl) ether in N,N-dimethylacetamide solvent and having an inherent viscosity of 3.6 was mixed with a mixture of acetic anhydride and beta-picoline (50% of the amounts theoretically required). The mixture was cast into a film and dried for one hour at 120° C. The resulting film was tough but somewhat soft, and contained about 25% of residual solvents, mostly N,N-dimethylacetamide. The film was clamped into a 4 x 6 inch frame and treated with the flame of a Meeker burner as described in Example 1. Surprisingly, there was no bubbling or ignition, and the film was tough, as tested by a hand stress-flex test.

EXAMPLE 3

A 10% by weight solution in N,N-dimethylacetamide of the polypyromellitamide-acid of bis(4-aminophenyl) ether, having an inherent viscosity of 3.0 as a 0.5% by weight solution in N,N-dimethylacetamide at 30° C., was treated with a mixture of acetic anhydride and beta-picoline to give 20% conversion to polyimide. This mixture was then cast onto glass plates. One sample was blown with a hair dryer to cause evaporation of enough solvent so that the film could be removed easily from the plate. The film, about 6 mils thick and having a volatile content of about 65% by weight, was clamped into a metal frame and treated with a bushy blue gas flame from a Meeker burner. This produced a dry film of the polyimide in the form of an open-celled foam.

Another sample on a glass plate was dried in an oven at 150° C. for 10 minutes. This increased the conversion to polyimide to above 50% and reduced the solvent content to about 25%. When mounted onto a frame and treated with a flame as described immediately above, this film changed to a pale yellow, taut film. The flaming time was about 1 minute overall for the 8 x 8 inch sample, or about 10 seconds for any given area. The infrared spectrum of this film was identical to that of authentic polypyromellitimides of bis(4-aminophenyl) ether. The 1.29 mil film had a tensile strength of 21,500 p.s.i., elongation of 45% and a modulus of 390,000 p.s.i., compared to about 13,000–15,000 p.s.i., 15–40% and 350,-

000–400,000 p.s.i. respectively, for films of the same chemical composition made in the same way but dried at 120° C. for 30 minutes under dry nitrogen in a forced draft oven, followed by further drying at 300° C. in a forced draft oven for about 45 minutes.

EXAMPLE 4

Polyimide film based on pyromellitic dianhydride and bis(4-aminophenyl) ether, and containing 15.5% by weight of N,N-dimethylacetamide, was placed on a pin tenter frame and dried under restraint. Flaming was done on one side of the film and the temperature recorded by a thermocouple on the reverse side of the film was in the range of 350° to 400° C. The residence time of the film in the flame was about 1 to 2 seconds. A clear, tough film containing 3.5% by weight N,N-dimethylacetamide was obtained.

EXAMPLE 5

Sheets of polyimide film based on pyromellitic dianhydride and bis(4-aminophenyl) ether were dried with a flame under restraint on pin frames. The film originally contained 15.5% by weight of N,N-dimethylacetamide and was dried to the point where it contained less than 0.1% by weight of this material. The dried film was 3.17 mils thick and exhibited the properties listed in the following table.

| Property | MD | TD |
|---|---|---|
| Modulus, p.s.i | 426,000 | 469,000 |
| Elongation, percent | 100 | 95 |
| Tensile strength, p.s.i | 25,000 | 28,000 |
| Orientation angle | 41 | 43 |

EXAMPLE 6

A sample of polyimide film based on pyromellitic dianhydride and bis(4-aminophenyl) ether which had been oriented by stretching 2X by 2X during drying was soaked in benzyl alcohol and then washed with acetone. The swollen film was mounted on a metal frame and allowed to dry in air at ambient temperature for about 3 months. The film was then flamed with a Meeker burner. Both the original and the flamed films had a thickness of 0.38 mil. The properties of these films are given in the following table.

| Property | Control Film | Flamed Film |
|---|---|---|
| Tensile strength, p.s.i | 43,000 | 36,000 |
| Elongation, percent | 35 | 27 |
| Modulus, p.s.i | 572,000 | 490,000 |

EXAMPLE 7

Polyimide film based on pyromellitic dianhydride and bis(4-aminophenyl) ether was continuously flame dried above a bank of burners inclined in the direction of film travel such that the film heated up gradually. The film speed was such that it required 15 seconds for the film to traverse the bank of burners.

When the film passed above the burners at a distance of about 3 inches above the burner, such that it passed through the flame at a point where a thermocouple recorded a temperature of 475° C., the solvent level in the film was reduced from 19% by weight to 11% by weight. The solvent was N,N-dimethylacetamide.

When the film passed above the burners at a distance of about 2 inches above the burner, at a point in the flame where a thermocouple recorded a temperature of about 540° C., the solvent level in the film was reduced from 18% by weight to 5% by weight.

When the film was passed through the flame at a point where 1 mil aluminum foil melted to a lump in approximately 3 seconds, the solvent level in the film was reduced from 17% by weight to 4% by weight.

EXAMPLE 8

To a solution of 5.257 grams (0.025 mole) of 4,4'-diaminostilbene in 96.4 grams of N,N-dimethylacetamide was added under nitrogen 5.453 grams (0.025 mole) of pyromellitic dianhydride. A deep yellow viscous solution of the polyamide-acid resulted. The polyamide-acid had an inherent viscosity (0.5% by weight in N,N-dimethylacetamide at 30° C.) of 3.49.

Films of the polyamide-acid were cast on glass plates and dried under vacuum at 80° C. for 30 minutes. The resulting film was placed on a frame, and dried and converted thermally to polyimide by flaming. The resulting polyimide film contained 1.5% by weight of residual dimethylacetamide.

To a 25-milliliter portion of the above polyamide-acid solution were added 2 milliliters each of acetic anhydride and pyridine. After stirring, films were cast on glass plates and the samples dried in an oven at 100° C. for 1 hour. Final drying was completed by placing the films on frames and flame drying. The films produced by this chemical conversion process were equivalent to those prepared by the above thermal conversion process.

EXAMPLE 9

Sheets of polyimide film based on pyromellitic dianhydride and a 60:40 molar ratio of bis(4-aminophenyl) ether and meta-phenylene diamine, approximately 4 inches by 5 inches in size, were clamped into metal frames and flamed with the bushy flame of a Meeker burner. Total flaming time for each sheet was approximately 2 minutes. The flame impinged directly onto the film. Before flaming the film exhibited orientation angles in both the machine direction and transverse direction of approximately 70°. The machine direction and transverse direction orientation angles of the flamed film were respectively 35° and 29°.

ADDITIONAL EXAMPLES

To practice the present invention with other aromatic polyimides, substitute in the foregoing examples polyimides of the following: pyromellitic dianhydride and bis(4-aminophenyl) methane; pyromellitic dianhydride and 4,4'-diaminobenzophenone; 3,4,3',4'-benzophenonetetracarboxylic dianhydride and bis(4-aminophenyl) ether; 3,4,3',4'-benzophenonetetracarboxylic dianhydride and m-phenylene diamine.

The foregoing examples can be repeated as will be readily understood by persons skilled in this art, by substituting other materials such as those listed above for those of the specific exemplifications.

It is to be understood that the foregoing detailed description is given merely by way of illustration and that many variations may be made therein without departing from the spirit or scope of this invention.

The invention claimed is:

1. The process of treating an aromatic polyimide film having a volatile content of less than about 30% by weight based on the total weight of said film, said process comprising exposing at least one surface of said film to an open gas flame for a time sufficient to raise the film temperature to between about 500° C. and the zero strength temperature of the film and hold it at such temperature for a time sufficient to drive off at least some of said volatiles from said film while holding said film under restraint.

2. The process of treating an aromatic polyimide film having a volatile content of less than about 30% by weight based on the total weight of said film, said polyimide being of an organic aromatic diamine of the formula $$H_2N—R^1—NH_2$$

wherein $R^1$ is a divalent radical selected from the group consisting of phenylene, naphthylene, biphenylene, anthrylene, furylene, benzfurylene and

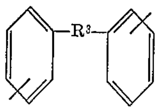

wherein $R^3$ is selected from the group consisting of an alkylene chain having 1–3 carbon atoms, —O—, —S—, $—SO_2—$,

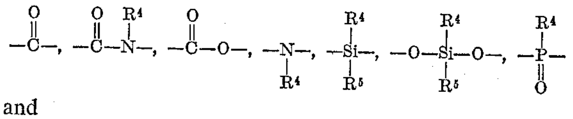

and

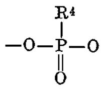

wherein $R^4$ and $R^5$ are selected from the group consisting of alkyl and aryl; and an aromatic tetracarboxylic acid of the formula

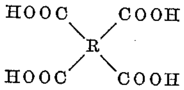

wherein R is a tetravalent aromatic radical selected from the group consisting of radicals having the structures:

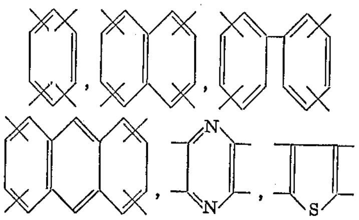

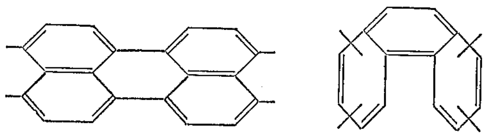

and

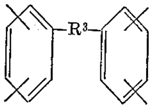

where $R^3$ has the same meaning as above; said process comprising exposing at least one surface of said film to an open gas flame for a time sufficient to raise the film temperature to between about 500° C. and the zero strength temperature of the film and hold it at such temperature for a time sufficient to drive off at least some of said volatiles from said film while holding said film under restraint.

3. The process of drying a film, from 0.1 to 10 mils thick, of the polypyromellitimide of bis(4-aminophenyl) ether, said film having a content of volatiles less than about 20% by weight based on the total weight of said film, said process comprising subjecting at least one surface of said film to an open gas flame for a time sufficient to raise the temperature of said surface to within the range of 500° to 750° C. but insufficient to char said film, while holding said film under restraint sufficient to prevent any substantial shrinkage of said film.

References Cited by the Examiner

UNITED STATES PATENTS

| | | | |
|---|---|---|---|
| 3,153,683 | 10/1964 | Bryan et al. | 264—80 |
| 3,171,873 | 3/1965 | Fikentscher et al. | 34—41 X |
| 3,179,614 | 4/1965 | Edwards | 260—30.2 |

KENNETH W. SPRAGUE, *Primary Examiner.*